(12) United States Patent
Kong et al.

(10) Patent No.: US 10,180,607 B2
(45) Date of Patent: Jan. 15, 2019

(54) DISPLAY PANEL AND DISPLAY DEVICE COMPRISING THE SAME

(71) Applicant: LG Display Co., Ltd., Seoul (KR)

(72) Inventors: Younghyun Kong, Incheon (KR); SungLim Nam, Paju-si (KR); WonJun Choi, Paju-si (KR); Misun Park, Gwangmyeong-si (KR); Jaewoong Choi, Anyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 57 days.

(21) Appl. No.: 15/244,721

(22) Filed: Aug. 23, 2016

(65) Prior Publication Data

US 2017/0082900 A1    Mar. 23, 2017

(30) Foreign Application Priority Data

Sep. 18, 2015 (KR) .................. 10-2015-0132291

(51) Int. Cl.
*G02F 1/1345* (2006.01)

(52) U.S. Cl.
CPC ...... *G02F 1/13458* (2013.01); *G02F 1/13452* (2013.01)

(58) Field of Classification Search
CPC .................. G02F 1/13452; G02F 1/13458
USPC ...................................................... 349/151
See application file for complete search history.

(56) References Cited

U.S. PATENT DOCUMENTS

| | | | | |
|---|---|---|---|---|
| 2005/0217720 A1* | 10/2005 | Rey-Mermet | ......... | G02F 1/1345 136/256 |
| 2010/0097551 A1* | 4/2010 | Yamagishi | ............ | G02F 1/1345 349/115 |
| 2011/0051068 A1* | 3/2011 | Kamon | ............... | G02F 1/13452 349/152 |
| 2012/0120616 A1* | 5/2012 | Katsui | ............... | G02F 1/136286 361/748 |
| 2014/0063394 A1* | 3/2014 | Jung | ................... | H01L 27/0296 349/42 |
| 2014/0085585 A1* | 3/2014 | Sung | ................... | G02F 1/13458 349/143 |
| 2014/0339574 A1* | 11/2014 | Kang | .................... | H01L 27/124 257/88 |
| 2016/0377905 A1* | 12/2016 | Choi | ................... | G02F 1/13452 257/72 |
| 2017/0005083 A1* | 1/2017 | Choi | ................... | H01L 27/3276 |

FOREIGN PATENT DOCUMENTS

| | | |
|---|---|---|
| EP | 2806307 A1 | 11/2014 |
| EP | 3112931 A1 | 1/2017 |
| JP | 03-110518 A | 5/1991 |

* cited by examiner

*Primary Examiner* — Christopher Raabe
(74) *Attorney, Agent, or Firm* — Dentons US LLP

(57) ABSTRACT

A display panel and a display device comprising the same are disclosed, in which a contact area between a connection electrode and a signal line is increased to reduce the contact resistance thereof and to improve picture quality.

19 Claims, 11 Drawing Sheets

DISPLAY PANEL AND DISPLAY DEVICE COMPRISING THE SAME

CROSS REFERENCE TO RELATED APPLICATIONS

This application claims the benefit of Korean Patent Application No. 10-2015-0132291 filed on Sep. 18, 2015, which is hereby incorporated by reference for all purposes as if fully set forth herein.

BACKGROUND

Field of the Invention

The present invention relates to a display device and a method for manufacturing the same, and more particularly, to a display device having a display panel with improved picture quality.

Discussion of the Related Art

Display devices, such as a liquid crystal display device, a plasma display panel, and an organic light emitting display device, have been developed.

A display device includes a display panel for displaying an image and a driving circuit for driving the display panel.

FIG. 1 is a brief view illustrating a display device according to the related art.

Referring to FIG. 1, the display device according to the related art includes a display panel 10, a driving circuit 30, and a front case 50.

The display panel 10 displays a predetermined image by controlling a transmittance of incident light from a plurality of light sources. The display panel 10 is comprised of a lower substrate 13 and an upper substrate 15.

The lower substrate 13 is provided with various signal lines, and a signal pad 17 is provided at an end of the signal lines.

The upper substrate 15 is bonded to the other lower substrate 13 with a liquid crystal layer (not shown) therebetween and the signal pad 17 of the lower substrate 13 being exposed. To do so, the upper substrate 15 is formed to have a size smaller than that of the lower substrate 13. The upper substrate 15 is provided with a color filter corresponding to each pixel, and may additionally be provided with a common electrode to which a common voltage is applied in accordance with a driving mode of the liquid crystal layer.

The driving circuit 30 is connected with the signal pad 17 and drives the display panel 10. The driving circuit 30 includes a flexible circuit film 31, a driving integrated circuit 33, and a printed circuit board 35.

The flexible circuit film 31 is attached to an upper surface of the signal pad 17 which is exposed.

The driving integrated circuit 33 is attached to an upper surface of the flexible circuit film 31. This driving integrated circuit 33 may have a chip on film (COF) structure.

The printed circuit board 35 applies various signals to the display panel 10 through the flexible circuit film 31. To this end, the printed circuit board 35 is in contact with the flexible circuit film 31.

The front case 50 covers a front edge portion of the display panel 10 and the driving circuit 30.

In the aforementioned display device according to the related art, the front case 50 is provided to surround the exposed signal pad 17 and the driving circuit 30, which increases the bezel area of the display device.

Recently, in order to reduce the bezel area of the display device, a side bonding method has been proposed, in which a signal line is provided at one side of the display panel and connected with the driving circuit by using a connection electrode.

However, such a side bonding method may increase the resistance of the signal line, and thus, a line image defect caused by a difference in luminance between pixels may occur when driving the display panel.

The aforementioned background art is technical information owned and acquired by the inventors of the present invention, and thus, should not be always considered the known art disclosed or available to the general public prior to filing of the present application.

SUMMARY

Accordingly, the present invention is directed to a display panel and a display device comprising the same, which substantially obviate one or more problems due to limitations and disadvantages of the related art.

An advantage of the present invention is to provide a display panel and a display device comprising the same, in which a contact area between a connection electrode and a signal line is increased to reduce the contact resistance thereof and to improve picture quality.

In various embodiments, a display panel comprises: a first substrate comprising a signal line that extends to an end of the first substrate; a second substrate facing the first substrate; and a connection electrode inserted between the first substrate and the second substrate and electrically connected to the signal line, wherein the connection electrode is connected to an outer side of the signal line that corresponds to the end of the first substrate.

In one or more embodiments, the connection electrode at least partially covers a surface of the signal line facing the second substrate.

In one or more embodiments, the connection electrode comprises: a side electrode pattern connected to the outer side of the signal line and at least partially covering an outer side of the first substrate and/or an outer side of the second substrate; and an insertion electrode pattern inserted between the first substrate and the second substrate and at least partially covering the surface of the signal line facing the second substrate.

In one or more embodiments, the insertion electrode pattern covers at least one lateral side of the signal line.

In one or more embodiments, the insertion electrode pattern covers opposite lateral sides of the signal line.

In one or more embodiments, at least one lateral side of the signal line is uncovered by the insertion electrode pattern.

In one or more embodiments, an end of the signal line corresponding to the end of the first substrate comprises a plurality of protruded patterns that protrude towards the end of the first substrate, wherein the connection electrode is inserted between at least one pair of protruded patterns which are adjacent to each other.

In one or more embodiments, an outer side of each of the plurality of protruded patterns is arranged on the same line as that of the outer side of the first substrate.

In one or more embodiments, the connection electrode is inserted between each pair of protruded patterns which are adjacent to each other.

In one or more embodiments, the connection electrode covers an outer side, a surface facing the second substrate, and opposite lateral sides of each of the plurality of protruded patterns.

In one or more embodiments, the display panel further comprises: an auxiliary signal line disposed on the signal line with an insulating layer provided between the signal line and the auxiliary signal line, the auxiliary signal line extending to the end of the first substrate; and a contact electrode provided on the signal line and the auxiliary signal line and electrically connecting the signal line with the auxiliary signal line, wherein the connection electrode is electrically connected to the auxiliary signal line, wherein the connection electrode is connected to an outer side of the auxiliary signal line that corresponds to the end of the first substrate, and wherein the connection electrode at least partially covers a surface of the auxiliary signal line facing the second substrate.

In one or more embodiments, the connection electrode comprises: a side electrode pattern connected to the outer side of the signal line and the outer side of the auxiliary signal line and at least partially covering an outer side of the first substrate and/or an outer side of the second substrate; and an insertion electrode pattern inserted between the first substrate and the second substrate and at least partially covering the surface of the auxiliary signal line facing the second substrate.

In one or more embodiments, an end of the signal line corresponding to the end of the first substrate comprises a plurality of first protruded patterns that protrude towards the end of the first substrate; and an end of the auxiliary signal line corresponding to the end of the first substrate comprises a plurality of second protruded patterns that protrude towards the end of the first substrate, wherein the connection electrode is inserted between at least one pair of first protruded patterns which are adjacent to each other, and wherein the connection electrode is inserted between at least one pair of second protruded patterns which are adjacent to each other.

In one or more embodiments, an outer side of each of the plurality of first protruded patterns is arranged on the same line as that of the outer side of the first substrate; and an outer side of each of the plurality of second protruded patterns is arranged on the same line as that of the outer side of the first substrate.

In one or more embodiments, the side electrode pattern is connected with an outer side of each of the plurality of first protruded patterns and an outer side of each of the plurality of second protruded pattern, which are exposed to the outer side of the first substrate, wherein the insertion electrode pattern is connected with opposite lateral sides of each of the plurality of first protruded patterns, with opposite lateral sides of each of the plurality of second protruded patterns, and with a surface of each of the plurality of second protruded patterns facing the second substrate.

In one or more embodiments, a width of the auxiliary signal line is greater than a width of the signal line.

In one or more embodiments, the display panel further comprises: an electrode line disposed on the signal line that extends to the end of the first substrate, and a passivation layer provided between the signal line and the electrode line, wherein the connection electrode is electrically connected to the electrode line, wherein the connection electrode is connected to an outer side of the electrode line that corresponds to the end of the first substrate, and at least partially covers a surface of the electrode line facing the second substrate, and wherein the electrode line is in physical contact with the signal line through at least one opening provided in the passivation layer.

In one or more embodiments, the at least one opening comprises at least one contact hole.

In one or more embodiments, the at least one opening comprises at least one slit arranged in parallel with a long side of the signal line.

In one or more embodiments, the connection electrode comprises: a side electrode pattern connected to the outer side of the signal line and the outer side of the electrode line and at least partially covering an outer side of the first substrate and/or an outer side of the second substrate; and an insertion electrode pattern inserted between the first substrate and the second substrate and at least partially covering the surface of the electrode line facing the second substrate.

In one or more embodiments, an end of the signal line corresponding to the end of the first substrate comprises a plurality of first protruded patterns that protrude towards the end of the first substrate; and an end of the electrode line corresponding to the end of the first substrate comprises a plurality of third protruded patterns that protrude towards the end of the first substrate, wherein the connection electrode is inserted between at least one pair of first protruded patterns which are adjacent to each other, and wherein the connection electrode is inserted between at least one pair of third protruded patterns which are adjacent to each other.

In one or more embodiments, an outer side of each of the plurality of first protruded patterns is arranged on the same line as that of the outer side of the first substrate; and an outer side of each of the plurality of third protruded patterns is arranged on the same line as that of the outer side of the first substrate.

In one or more embodiments, the side electrode pattern is connected with an outer side of each of the plurality of first protruded patterns and an outer side of each of the plurality of third protruded patterns, which are exposed to the outer side of the first substrate, and the insertion electrode pattern is connected with opposite lateral sides of each of the plurality of first protruded patterns, with opposite lateral sides of each of the plurality of third protruded patterns, and with a surface of each of the plurality of third protruded patterns facing the second substrate.

In one or more embodiments, the first substrate further comprises: an auxiliary signal line disposed between the signal line and the electrode line with the passivation layer arranged between the auxiliary signal line and the electrode line and an insulating layer arranged between the signal line and the auxiliary signal line, wherein the connection electrode covers an outer side of the auxiliary signal line that corresponds to the end of the first substrate, and wherein the electrode line is in physical contact with the auxiliary signal line through at least one opening, preferably a contact hole, provided in the passivation layer.

In one or more embodiments, an end of the signal line corresponding to the end of the first substrate comprises a plurality of first protruded patterns that protrude towards the end of the first substrate; an end of the auxiliary signal line corresponding to the end of the first substrate comprises a plurality of second protruded patterns that protrude towards the end of the first substrate; and an end of the electrode line corresponding to the end of the first substrate comprises a plurality of third protruded patterns that protrude towards the end of the first substrate, wherein the connection electrode is inserted between at least one pair of first protruded patterns which are adjacent to each other, wherein the connection electrode is inserted between at least one pair of second protruded patterns which are adjacent to each other, and wherein the connection electrode is inserted between at least one pair of third protruded patterns which are adjacent to each other.

In one or more embodiments, an outer side of each of the plurality of first protruded patterns is arranged on the same line as that of the outer side of the first substrate; an outer side of each of the plurality of second protruded patterns is arranged on the same line as that of the outer side of the first substrate; and an outer side of each of the plurality of third protruded patterns is arranged on the same line as that of the outer side of the first substrate.

In one or more embodiments, the connection electrode comprises: a side electrode pattern connected to the outer side of the signal line, the outer side of the auxiliary signal line and the outer side of the electrode line and at least partially covering an outer side of the first substrate and/or an outer side of the second substrate; and an insertion electrode pattern inserted between the first substrate and the second substrate and at least partially covering the surface of the electrode line facing the second substrate; wherein the side electrode pattern is connected with an outer side of each of the plurality of first protruded patterns, an outer side of each of the plurality of second protruded patterns and an outer side of each of the plurality of third protruded patterns, which are exposed to the outer side of the first substrate, and wherein the insertion electrode pattern is connected with opposite lateral sides of each of the plurality of first protruded patterns, with opposite lateral sides of each of the plurality of second protruded patterns, with opposite lateral sides of each of the plurality of third protruded patterns, and with a surface of each of the plurality of third protruded patterns facing the second substrate.

In one or more embodiments, the display panel further comprises at least one barrier pattern arranged next to the signal line and configured to prevent an electrical short between the signal line and an additional signal line of the first substrate.

In one or more embodiments, the at least one barrier pattern is arranged in parallel with at least one lateral side of the signal line.

In various embodiments, a display device comprises: a display panel according to one or more embodiments described herein; and a driving circuit connected to the signal line of the display panel through the connection electrode of the display panel.

In some embodiments, a display panel comprises: a first substrate comprising a signal line that extends to an end of the first substrate; a second substrate facing the first substrate; and a connection electrode inserted between the first substrate and the second substrate and electrically connected to the signal line, wherein the connection electrode is connected to an outer side of the signal line that corresponds to the end of the first substrate, and wherein the connection electrode at least partially covers a surface of the signal line facing the second substrate.

In some embodiments, a display panel comprises: a first substrate comprising a signal line that extends to an end of the first substrate, and an auxiliary signal line disposed on the signal line with an insulating layer provided between the signal line and the auxiliary signal line, the auxiliary signal line extending to the end of the first substrate; a second substrate facing the first substrate; and a connection electrode inserted between the first substrate and the second substrate and electrically connected to the signal line and the auxiliary signal line, wherein the connection electrode is connected to an outer side of the signal line and an outer side of the auxiliary signal line that correspond to the end of the first substrate, and at least partially covers a surface of the auxiliary signal line facing the second substrate; and a contact electrode provided on the signal line and the auxiliary signal line and electrically connecting the signal line with the auxiliary signal line.

In some embodiments, a display panel comprises: a first substrate comprising a signal line and an electrode line disposed on the signal line that extend to an end of the first substrate, and a passivation layer provided between the signal line and the electrode line; a second substrate facing the first substrate; and a connection electrode inserted between the first substrate and the second substrate and electrically connected to the signal line and the electrode line, wherein the connection electrode is connected to an outer side of the signal line and an outer side of the electrode line that correspond to the end of the first substrate, and at least partially covers a surface of the electrode line facing the second substrate, and wherein the electrode line is in physical contact with the signal line through at least one opening provided in the passivation layer.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, the embodiments of a display panel and a display device comprising the same according to the present invention will be described with reference to the accompanying drawings. Wherever possible, the same reference numbers will be used throughout the drawings to refer to the same or like parts. Also, in the following description, if detailed description of elements or functions known in the art is determined to make the subject matter of the present invention unnecessarily obscure, the detailed description will be omitted.

Figure 1:
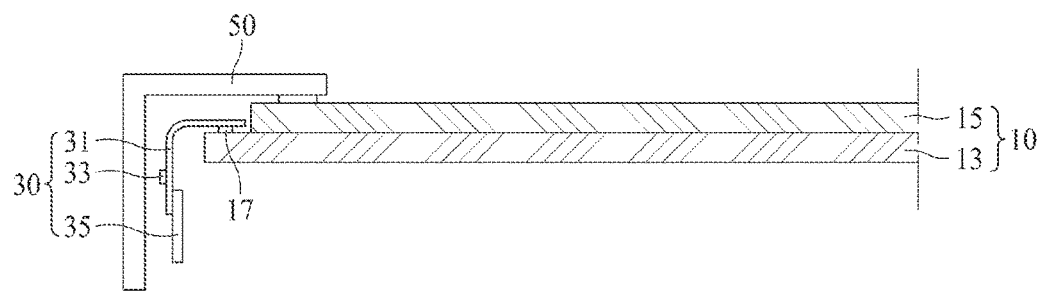
FIG. 1 is a cross-sectional view illustrating a display device according to the related art.
Figure 2:
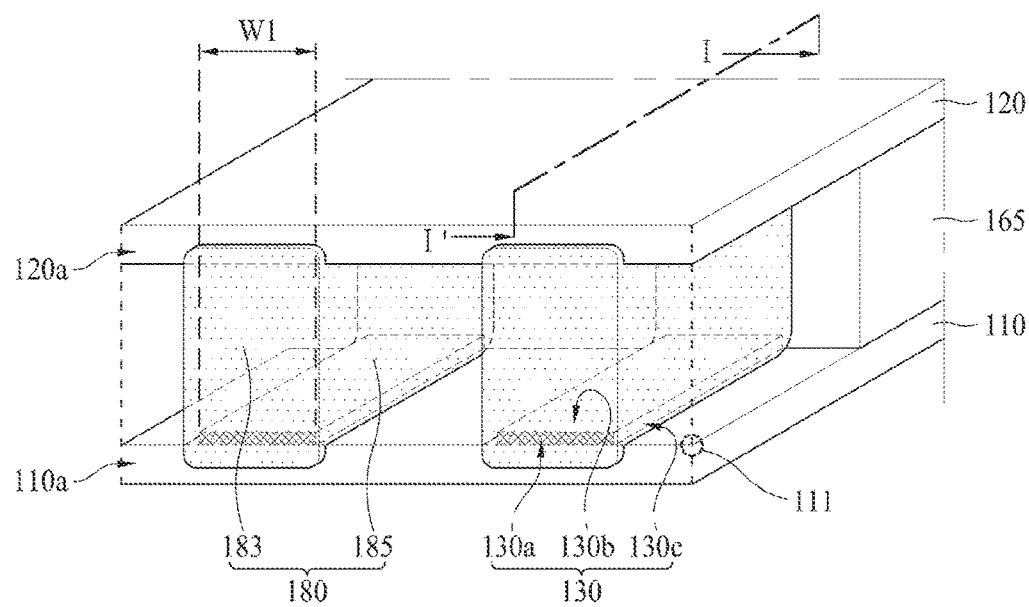
FIG. 2 is a brief view illustrating a display panel according to the first embodiment of the present invention.
Figure 3:
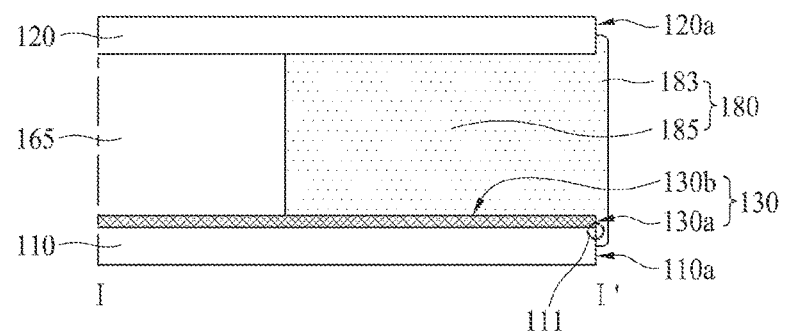
FIG. 3 is a brief cross-sectional view taken along line I-I' shown in FIG. 2.

FIG. 2 is a brief view illustrating a display panel according to the first embodiment of the present invention, and FIG. 3 is a brief cross-sectional view taken along line I-I' shown in FIG. 2.

Referring to FIGS. 2 and 3, the display panel according to the first embodiment of the present invention includes a lower substrate 110, an upper substrate 120, and a connection electrode 180.

The lower substrate 110 includes a plurality of pixels (not shown) formed at each portion where a plurality of gate lines (not shown) cross a plurality of data lines (not shown). Each pixel may include a thin film transistor (not shown) connected to the gate and data lines, a pixel electrode connected to the thin film transistor, and a common electrode formed to adjoin the pixel electrode and supplied with a common voltage. The lower substrate 110 controls light transmittance of a liquid crystal layer by forming an electric field corresponding to a differential voltage between a data voltage and a common voltage, which are applied to each pixel.

Also, the lower substrate 110 includes a signal line 130. The signal line 130 has a first width W1, and is extended to an end 111 of the lower substrate 110. Therefore, an outer side 130a of the signal line 130 and an outer side 110a of the lower substrate 110 may be arranged on the substantially same line. In other words, the outer side 130a of the signal line 130 and the outer side 110a of the lower substrate 110 may substantially match each other. The signal line 130 is connected with a driving circuit (not shown) through a connection electrode 180. The signal line 130 may be a gate line or an extension line extended from the gate line. Various modifications may be made in the shape of the signal line 130. The various shapes of the signal line 130 will be described later.

The upper substrate 120 is bonded to the lower substrate 110 with the liquid crystal layer (not shown) therebetween. The upper substrate 120 is provided with a color filter corresponding to each pixel, and may additionally be provided with a common electrode to which a common voltage is supplied, in accordance with a driving mode of the liquid crystal layer.

The upper substrate 120 is bonded to the lower substrate 110 by a sealing member 165. The sealing member 165 is provided to be spaced apart from the end 111 of the lower substrate 110. Therefore, a space to which the connection electrode 180 may be inserted is provided between the upper substrate 120 and the lower substrate 110. The connection electrode 180 is inserted between the upper substrate 120 and the lower substrate 110 to cover the signal line 130.

Other elements of the lower substrate 110 and the upper substrate 120 may be formed in various shapes known in the art in accordance with the driving mode of the liquid crystal layer, for example, a TN (Twisted Nematic) mode, a VA (Vertical Alignment) mode, an IPS (In plane switching) mode, and an FFS (Fringe field switching) mode.

The connection electrode 180 is provided at outer sides 110a and 120a of the lower substrate 110 and the upper substrate 120, which are bonded to each other. The connection electrode 180 is connected to the outer side 130a of the signal line 130 exposed to the side 110a of the lower substrate 110. The connection electrode 180 is connected with the outer side 130a of the signal line 130 and inserted between the upper substrate 120 and the lower substrate 110. In this case, the connection electrode 180 may electrically be connected with the signal line 130. The connection electrode 180 includes a side electrode pattern 183 and an insertion electrode pattern 185. The side electrode pattern 183 refers to a first portion of the connection electrode 180 and the insertion electrode pattern refers to a second portion of the connection electrode 180. The side electrode pattern 183 and the insertion electrode pattern 185 may be contiguous. They may be made of the same material and/or layer.

The side electrode pattern 183 is connected to the outer side 130a of the signal line 130 and covers at least one side of the lower substrate 110 and the upper substrate 120. The side electrode pattern 183 may cover the entire outer side 130a of the signal line 130.

The insertion electrode pattern 185 is inserted between the lower substrate 110 and the upper substrate 120. The insertion electrode pattern 185 is connected with the signal line 130 by being inserted between the upper substrate 120 and the lower substrate 110. The insertion electrode pattern 185 covers an upper surface 130b of the signal line 130. Also, the insertion electrode pattern 185 may flow from the upper surface 130b of the signal line 130 to cover both sides 130c (opposite lateral sides) of the signal line 130.

For convenience of description, in the drawings, the insertion electrode pattern 185 fully covers the upper surface 130b of the signal line 130 which is not overlapped with the sealing member 165. However, without limitation to the above example of the insertion electrode pattern 185, the insertion electrode pattern 185 may partially cover the upper surface 130b of the signal line 130 which is not overlapped with the sealing member 165. The connection electrode 180 may be made of, but not limited to, Ag having an excellent conductivity.

According to the first embodiment of the present invention, since the connection electrode 180 is connected with the outer side 130a, the upper surface 130b and both sides 130c of the signal line 130, a contact area between the signal line 130 and the connection electrode 180 may be more increased than that of the related art in which the connection electrode 180 is connected with the outer side 130a of the signal line 130.

As a result, the resistance of the signal line 130 may be reduced, and thus, a line image defect generated when driving the display panel may be reduced or avoided, thereby improving the picture quality and reliability of the display panel.

Figure 4:
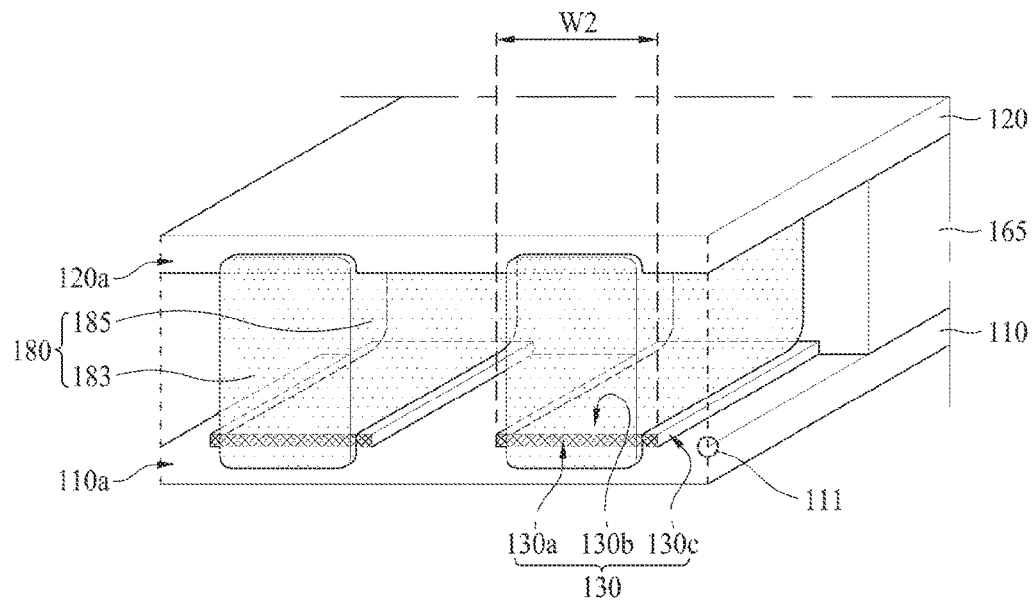
FIGS. 4 and 5 are views illustrating modified embodiments of a display panel according to the first embodiment of the present invention.
Figure 5:
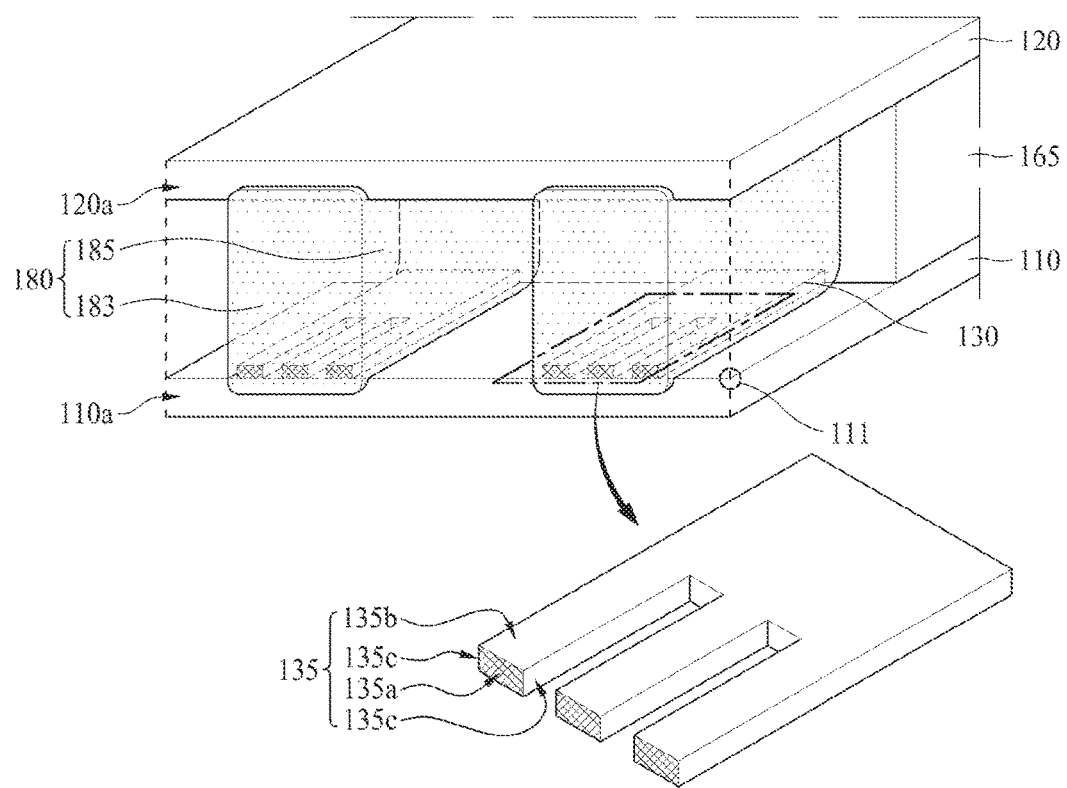

FIGS. 4 and 5 are views illustrating modified embodiments of a display panel according to the first embodiment of the present invention. In FIGS. 4 and 5, the shape of the signal line 130 is modified in the display panel according to the first embodiment of the present invention. Therefore, in the following description, the signal line 130 and its related elements will be described in detail, and repeated description of the other elements will be omitted.

Referring to FIG. 4, the signal line 130 according to the modified embodiment of the present invention has a second width W2. The second width W2 is greater than the first width W1 of the signal line 130 according to the first embodiment of the present invention. The connection electrode 180 covers the outer side 130a and the upper surface 130b of the signal line 130. The side electrode pattern 183 is connected with the outer side 130a of the signal line 130. The insertion electrode pattern 185 is connected with the upper surface 130b of the signal line 130. In this case, both sides 130c of the signal line 130 may not be in contact with the insertion electrode pattern 185. Since the second width W2 of the signal line 130 becomes wider, the insertion electrode pattern 185 may not be connected with both sides 130c of the signal line 130. In other words, the lateral sides 130c of the signal line 130 may be uncovered (not covered) by the insertion electrode pattern 185. In still other words, the lateral sides 130c of the signal lines may be free from the insertion electrode pattern 185.

The display panel according to this modified embodiment may provide the same effects as that of the display panel according to the first embodiment illustrated in FIG. 2.

Referring to FIG. 5, an end of the signal line 130 according to another modified embodiment of the present invention is comprised of a plurality of protruded patterns 135. Each of the plurality of protruded patterns 135 is protruded toward the end 111 of the lower substrate 110. An outer side 135a of each of the plurality of protruded patterns 135 is arranged on the substantially same line as that of the outer side 110a of the lower substrate 110. Each of the plurality of protruded patterns 135 is spaced apart from another protruded pattern at a certain interval. The connection electrode 180 may be inserted between the protruded patterns 135 which are adjacent to each other.

Although three protruded patterns 135 are shown in another modified embodiment of the present invention, two or more protruded patterns 135 may be provided without limitation to this modified embodiment.

The connection electrode 180 covers the outer side 135a, the upper surface 135b and both sides 135c of each of the plurality of protruded patterns 135. In this case, the side electrode pattern 183 is electrically connected with the outer side 135a of each of the plurality of protruded patterns 135 exposed to the side 110a of the lower substrate 110. Also, the insertion electrode pattern 185 is electrically connected with the upper surface 135b and both sides 135c of each of the plurality of protruded patterns 135. That is, the insertion electrode pattern 185 is inserted between the plurality of protruded patterns 135 which are adjacent to each other, and covers both sides 135c of each of the plurality of protruded patterns 135.

According to this modified embodiment, since a contact area between the connection electrode 180 and the signal line 130 is increased, the resistance of the signal line 130 may be reduced. As a result, a line image defect generated when driving the display panel may be reduced or avoided, thereby improving the picture quality and reliability of the display panel.

Figure 6:
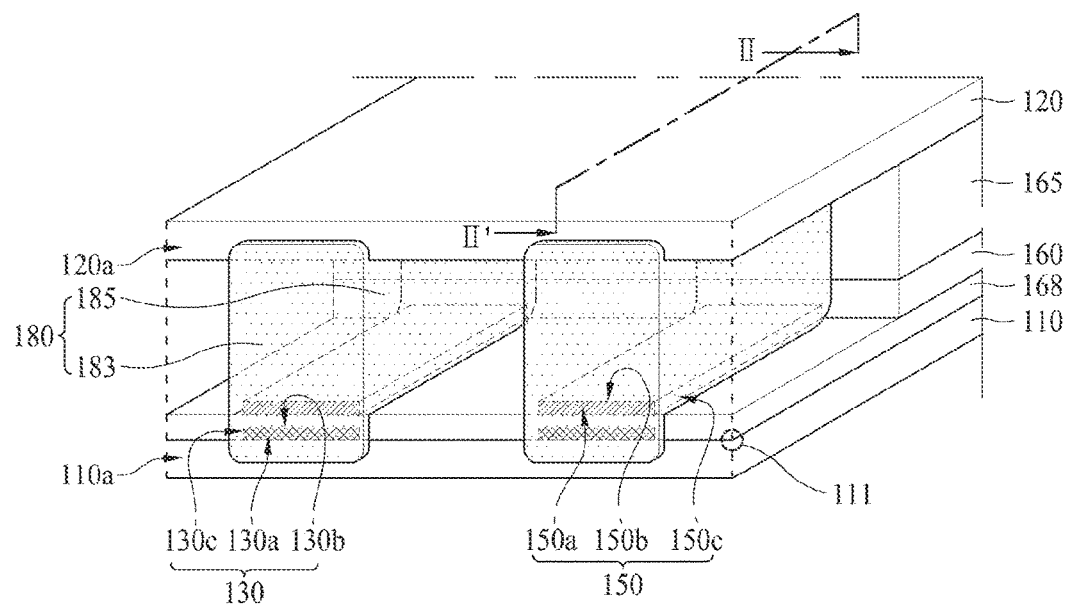
FIG. 6 is a brief view illustrating a display panel according to the second embodiment of the present invention.
Figure 7:
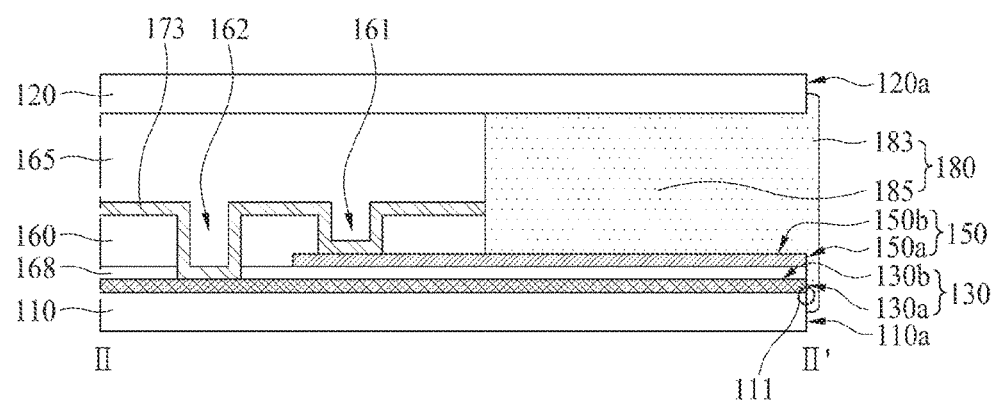
FIG. 7 is a brief cross-sectional view taken along line II-II' shown in FIG. 6.

FIG. 6 is a brief view illustrating a display panel according to the second embodiment of the present invention. FIG. 7 is a brief cross-sectional view taken along line II-II' shown in FIG. 6. In this embodiment, the lower substrate 110 of the display panel according to the first embodiment of the present invention additionally includes an auxiliary signal line 150 and a contact electrode 173. Therefore, in the following description, the auxiliary signal line 150, the contact electrode 173 and their related elements will be described in detail, and repeated description of the other elements will be omitted.

Referring to FIGS. 6 and 7, the auxiliary signal line 150 according to the second embodiment is provided on the signal line 130. The auxiliary signal line 150 is provided to overlap the signal line 130. The auxiliary signal line 150 and the signal line 130 may be made of, but not limited to, the same pattern. The auxiliary signal line 150 may be a data line or an extension line extended from the data line.

An insulating layer 168 may be provided between the auxiliary signal line 150 and the signal line 130. The insulating layer 168 serves to insulate the auxiliary signal line 150 from the signal line 130. The insulating layer 168 covers the upper surface 130a and both sides 130c of the signal line 130. In this case, the upper surface 130a of the signal line 130 is partially exposed to be in contact with the contact electrode 173. The signal line 130 and the auxiliary signal line 150 are arranged up and down by interposing the insulating layer 168 therebetween.

The contact electrode 173 is provided on the signal line 130 and the auxiliary signal line 150. The contact electrode 173 is provided at a position where it is overlapped with the sealing member 165. The contact electrode 173 is covered by the sealing member 165. The contact electrode 173 serves to electrically connect the signal line 130 with the auxiliary signal line 150. That is, the signal line 130 and the auxiliary signal line 150, which are spaced apart from each other by the insulating layer 168, are electrically connected with each other through the contact electrode 173.

A passivation layer 160 is provided between the contact electrode 173 and the auxiliary signal line 150. In this case, the contact electrode 173 is electrically connected with the auxiliary signal line 150 through a first contact hole 161 provided in the passivation layer 160. Also, the contact electrode 173 is electrically connected with the signal line 130 through a second contact hole 162 provided in the passivation layer 160 and the insulating layer 168. As a result, the signal line 130 and the auxiliary signal line 150 may electrically be connected with each other through the contact electrode 173. Alternatively, the contact electrode 173 may be in physical contact with the connection electrode 180, as illustrated in FIG. 7.

The connection electrode 180 covers the outer side 130a of the signal line 130 exposed to the outer side 110a of the lower substrate 110. Also, the connection electrode 180 covers an outer side 150a of the auxiliary signal line 150 exposed to the outer side 110a of the lower substrate 110 and also covers an upper surface 150b of the auxiliary signal line 150. In this case, the side electrode pattern 183 is electrically connected with the outer side 130a of the signal line 130 and the outer side 150a of the auxiliary signal line 150. The insertion electrode pattern 185 is electrically connected with the upper surface 150b of the auxiliary signal line 150.

According to the second embodiment, since the connection electrode 180 covers the outer side 130a of the signal line 130 and the outer side 150a and the upper surface 150b of the auxiliary signal line 150, the contact area between the connection electrode 180 and the signal line 130 may be more increased than that of the first embodiment. As a result, the resistance of the signal line 130 may be reduced, and thus, a line image defect generated when driving the display panel may be reduced or avoided, thereby improving the picture quality and reliability of the display panel.

Figure 8:
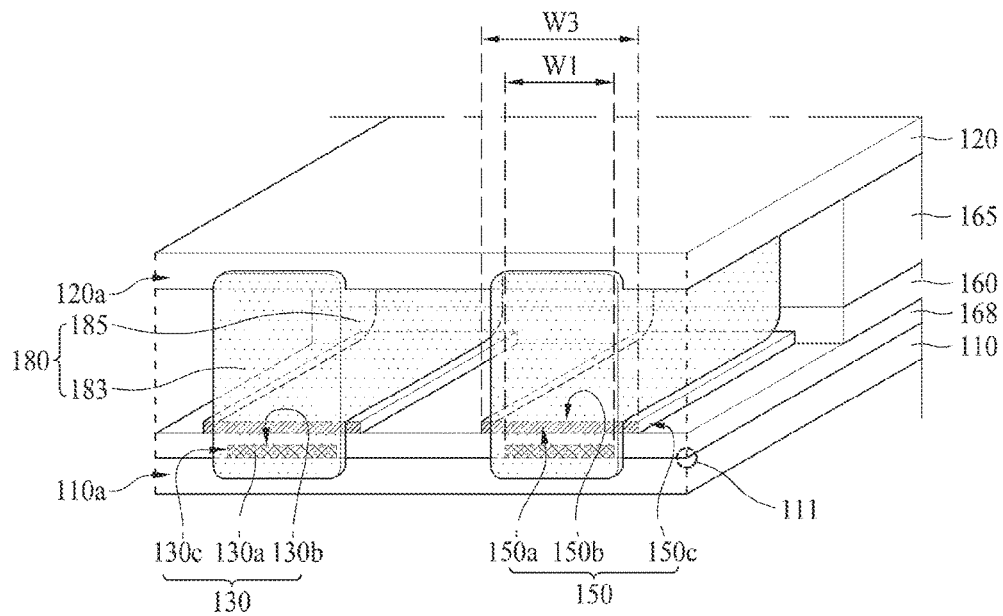
FIGS. 8 and 9 are views illustrating modified embodiments of a display panel according to the second embodiment of the present invention.
Figure 9:
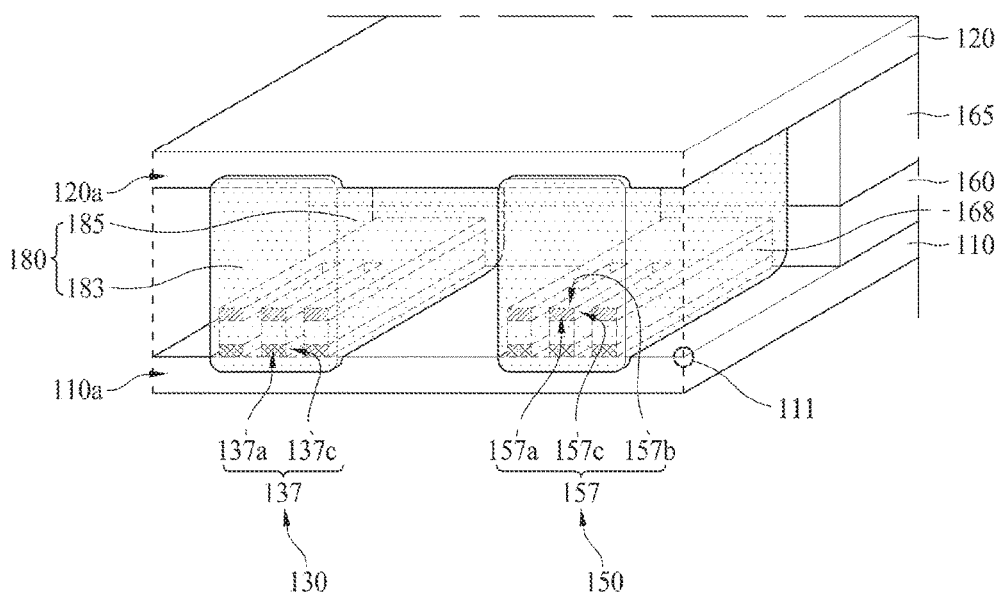

FIGS. 8 and 9 are views illustrating modified embodiments of a display panel according to the second embodiment of the present invention. In this modified embodiment of the present invention, the shapes of the signal line 130 and the auxiliary signal line 150 are modified in the display panel according to the second embodiment of the present invention. Therefore, in the following description, the signal line 130, the auxiliary signal line 150 and their related elements will be described in detail, and repeated description of the other elements will be omitted.

Referring to FIG. 8, the auxiliary signal line 150 and the signal line 130 according to the modified embodiment of the present invention have their respective patterns different from each other. That is, a third width W3 of the auxiliary signal line 150 is provided to be greater than the first width W1 of the signal line 130. The connection electrode 180 covers the outer side 130a of the signal line 130. Also, the connection electrode covers the outer side 150a and the upper surface 150b of the auxiliary signal line 150. In this case, the side electrode pattern 183 is electrically connected with the outer side 130a of the signal line 130 and the outer side 150a of the auxiliary signal line 150. The insertion electrode pattern 185 is electrically connected with the upper surface 150b of the auxiliary signal line 150.

The display panel according to this modified embodiment may provide the same effects as that of the display panel according to the second embodiment shown in FIG. 6.

Referring to FIG. 9, an end of the signal line 130 according to another modified embodiment of the present invention is comprised of a plurality of first protruded patterns 137. Each of the plurality of first protruded patterns 137 is spaced apart from another protruded pattern at a certain interval. An outer side 137a of each of the plurality of first protruded patterns 137 is arranged on the substantially same line as the outer side 110a of the lower substrate 110.

An end of the auxiliary signal line 150 according to another modified embodiment is comprised of a plurality of second protruded patterns 157. Each of the plurality of second protruded patterns 157 is protruded toward the end 111 of the lower substrate 100. An outer side 157a of each of the plurality of second protruded patterns 157 is arranged on the substantially same line as the side 110a of the lower substrate 110. Each of the plurality of second protruded patterns 157 is spaced apart from another protruded pattern at a certain interval.

An insulating layer 168 is provided between the first protruded pattern 137 and the second protruded pattern 157. The first protruded pattern 137 and the second protruded pattern 157 are overlapped with each other by interposing the insulating layer 168 therebetween.

The side electrode pattern 183 according to another modified embodiment is connected with the outer side 137a of each of the plurality of first protruded patterns 137 and the outer side 157a of each of the plurality of second protruded patterns 157, which are exposed to the side 110a of the lower substrate 110. The insertion electrode pattern 185 is connected with both sides 137c of each of the plurality of first protruded patterns 137. Also, the insertion electrode pattern 185 is connected with the upper surface 157b and both sides 157c of each of the plurality of second protruded patterns 157.

In the display panel according to this modified embodiment, since a contact area of the connection electrode 180 with the signal line 130 and the auxiliary signal line 150 is increased, the resistance of the signal line 130 may additionally be reduced as compared with the display panel according to the second embodiment illustrated in FIG. 6. As a result, a line image defect generated when driving the display panel may be reduced or avoided.

Figure 10:
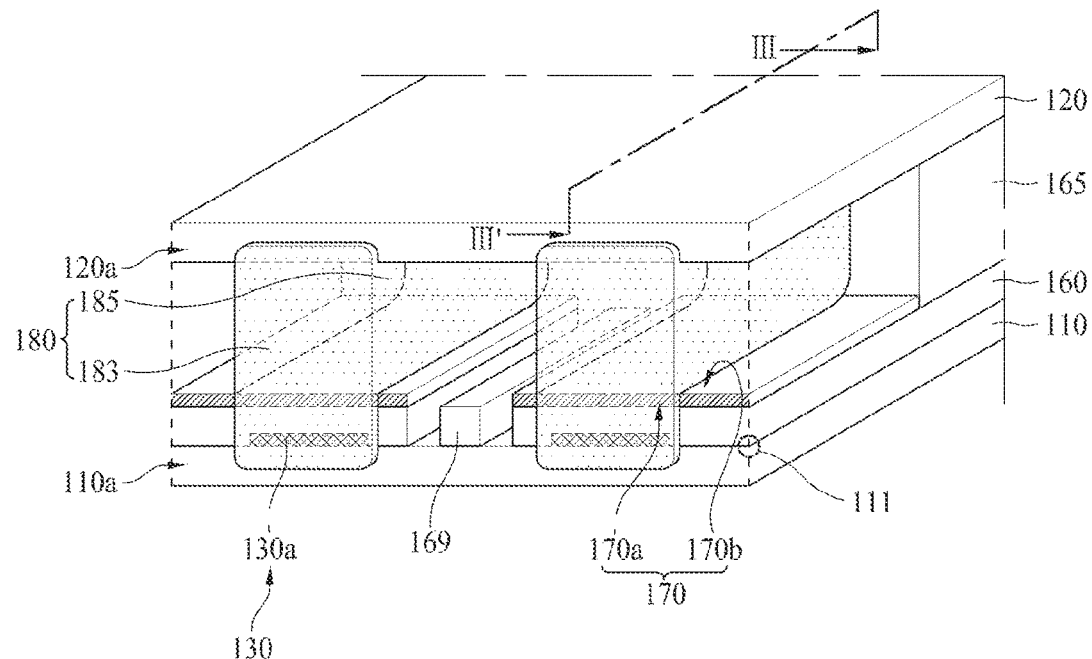
FIG. 10 is a brief view illustrating a display panel according to the third embodiment of the present invention.
Figure 11:
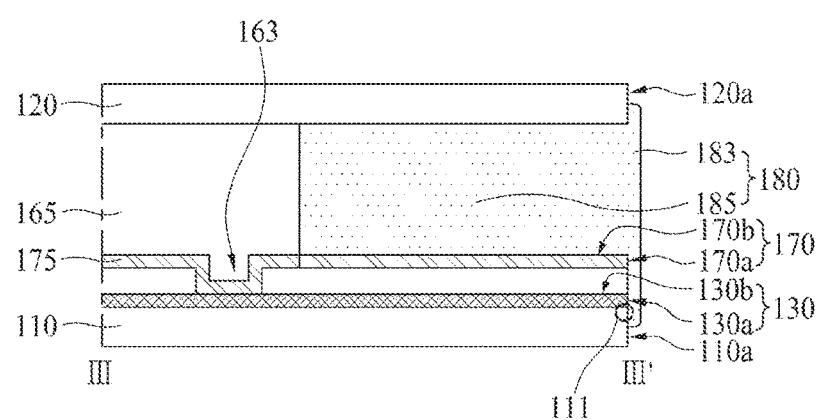
FIG. 11 is a brief cross-sectional view taken along line shown in FIG. 10.

FIG. 10 is a brief view illustrating a display panel according to the third embodiment of the present invention, and FIG. 11 is a brief cross-sectional view taken along line shown in FIG. 10. In this embodiment, the display panel according to the first embodiment of the present invention additionally includes an electrode line 170. Therefore, in the following description, the additional electrode line 170 and its related elements will be described in detail, and repeated description of the other elements will be omitted.

Referring to FIGS. 10 and 11, the electrode line 170 according to the third embodiment is provided on the signal line 130 to overlap the signal line 130 and connected with the pixel electrode of the lower substrate 110. That is, the electrode line 170 may be an extension line extended from the pixel electrode, so as to be connected with the connection electrode 180. In this case, the pixel electrode is provided within a display pixel of the display panel and connected with a thin film transistor provided in the display pixel. A passivation layer 160 may be provided between the electrode line 170 and the signal line 130 to insulate the electrode line 170 from the signal line 130. The electrode line 170 and the signal line 130 are arranged up and down by interposing the passivation layer 160 therebetween.

An auxiliary contact line 175 according to the third embodiment is arranged at a position where it is overlapped with the sealing member 165. The auxiliary contact line 175 is provided on the signal line 130 and electrically connects the signal line 130 with the electrode line 170. The auxiliary contact line 175 is connected with the electrode line 170, and is connected with the signal line 130 through a third contact hole 163 provided in the passivation layer 160.

The connection electrode 180 according to the third embodiment covers the outer side 130a of the signal line 130 exposed to the side 110a of the lower substrate 110. Also, the connection electrode 180 covers an outer side 170a and an upper surface 170b of the electrode line 170 exposed to the side 110a of the lower substrate 110. In this case, the connection electrode 180 may electrically be connected with the signal line 130 and the electrode line 170. A side electrode pattern 183 is connected with the outer side 130a of the signal line 130 and the outer side 170a of the electrode line 170, and the insertion electrode pattern 185 is connected with the upper surface 170b of the electrode line 170.

According to the third embodiment, since the connection electrode 180 covers the outer side 130a of the signal line 130 and the outer side 170a and the upper surface 170b of the electrode line 170, the contact area between the connection electrode 180 and the signal line 130 may be more increased than that of the first embodiment. As a result, the resistance of the signal line 130 may additionally be reduced, and thus, a line image defect generated when driving the display panel may be reduced or avoided.

Additionally, the display panel according to the third embodiment of the present invention may further include a barrier pattern 169. The barrier pattern 169 serves to reduce or prevent a short-circuit between the signal lines 130, which are adjacent to each other. The barrier pattern 169 is provided in the same layer as the passivation layer 160. The barrier pattern 169 is arranged in parallel with at least one side of both sides (opposite lateral sides) 130c of the signal line 130.

The barrier pattern 169 may be applied to various embodiments of the present invention. Also, although one barrier pattern 169 is illustrated in the drawing, the number of barrier patterns 169 is not limited to the above example, and two or more barrier patterns 169 may be provided according to one embodiment of the present invention.

According to the third embodiment, since the connection electrode 180 covers the outer side 130a of the signal line 130 and the outer side 170a and the upper surface 170b of the electrode line 170, the contact area between the connection electrode 180 and the signal line 130 may be more increased than that of one embodiment of the present invention. As a result, the resistance of the signal line 130 connected with the connection electrode 180 may be reduced, and thus, a line image defect generated when driving the display panel may be reduced or avoided, thereby improving the picture quality and reliability of the display panel.

Figure 12:
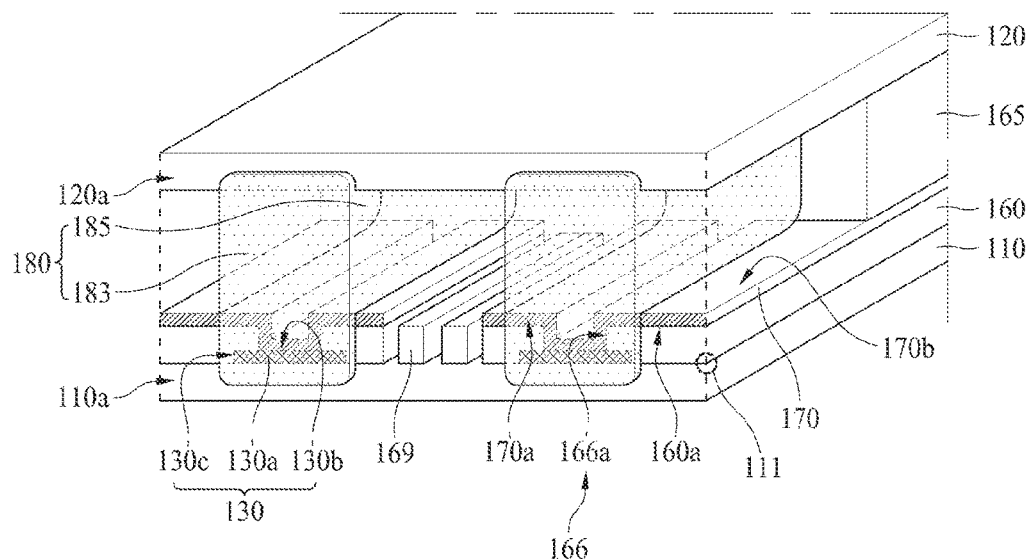
FIGS. 12 to 14 are views illustrating modified embodiments of a display panel according to the third embodiment of the present invention.
Figure 13:
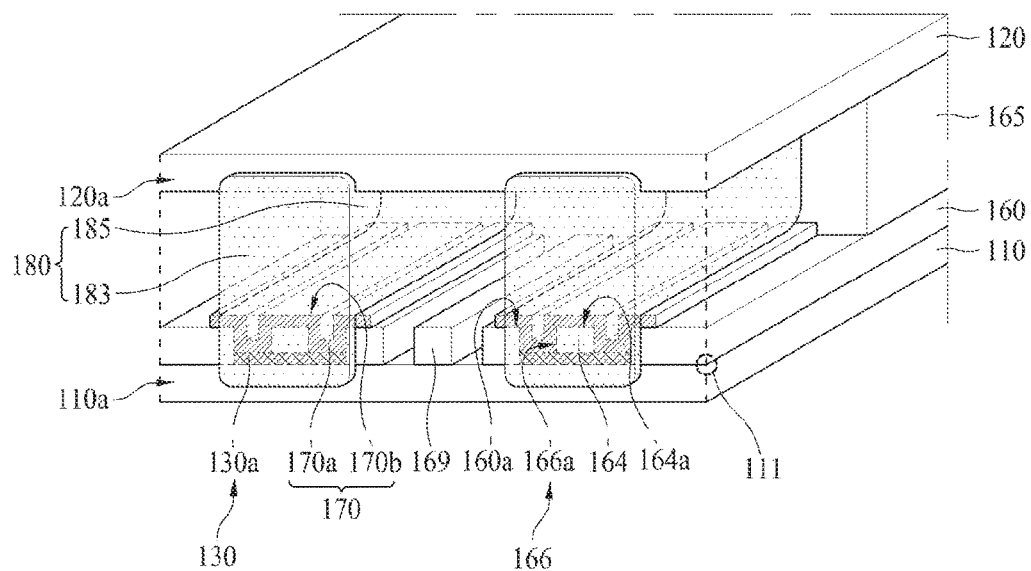
Figure 14:
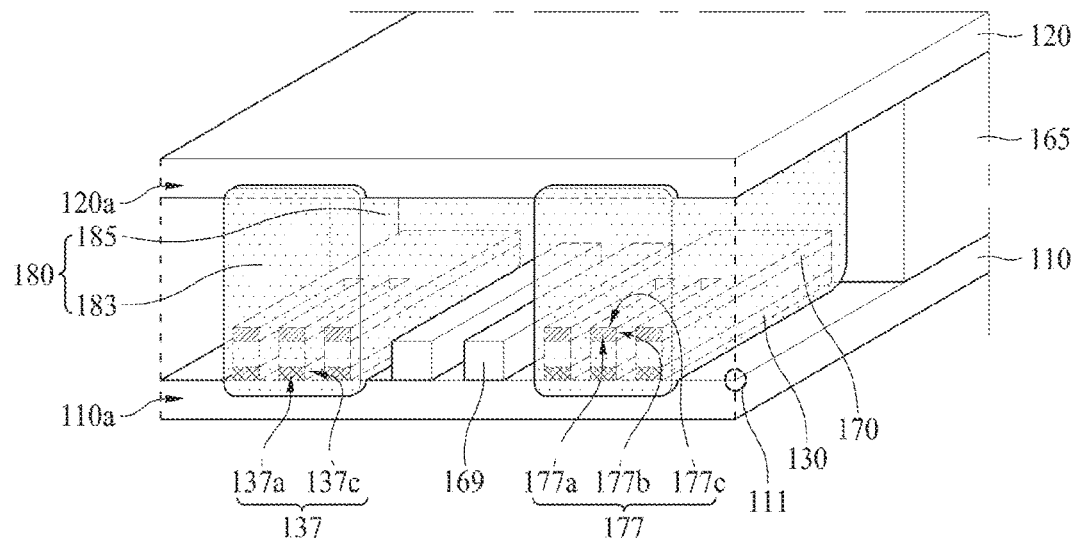

FIGS. 12 to 14 are views illustrating modified embodiments of a display panel according to the third embodiment of the present invention.

Referring to FIG. 12, the electrode line 170 according to the modified embodiment is provided on the signal line 130. The passivation layer 160 is provided between the signal line 130 and the electrode line 170. The passivation layer 160 partially exposes the signal line 130, and surrounds both sides 130c of the signal line 130. Therefore, the passivation layer 160 may be provided with at least one slit 166 that partially exposes the upper surface of the signal line 130. The slit 166 is arranged in substantially parallel with a long side of the signal line 130. In other words, the slit 166 may be arranged along a length direction of the signal line 130.

The electrode line 170 is connected with a part of the upper surface of the signal line 130 through the slit 166. The electrode line 170 surrounds an upper surface 160a of the passivation layer 160 and a side 166a of the slit 166, which are overlapped with the signal line 130.

The side electrode pattern 183 is connected with the outer side 170a of the electrode line 170 and the outer side 130a of the signal line 130. The insertion electrode pattern 185 is connected with the upper surface 170b of the electrode line 170. In this case, the insertion electrode pattern 185 is inserted into the upper surface 170b of the electrode line 170 overlapped with the slit 166.

In the display panel according to this modified embodiment, since the contact area of the connection electrode 180 with the signal line 130 and the electrode line 170 is more increased than that of the display panel according to the third embodiment illustrated in FIG. 10, the resistance of the signal line 130 may further be reduced.

Referring to FIG. 13, a plurality of slits 166 are provided on the signal line 130 in accordance with another modified embodiment. The passivation layer 160 partially exposes the signal line 130, and surrounds both sides 130c of the signal line 130. In this case, an island-shaped auxiliary passivation layer 164 may be provided on the signal line 130. The plurality of slits 166 are arranged in substantially parallel with each other by interposing the auxiliary passivation layer 164 therebetween.

The electrode line 170 is connected with a part of the upper surface of the signal line 130 through the slits 166. The electrode line 170 surrounds an upper surface 160a of the passivation layer 160 and sides 166a of the slits 166, which are overlapped with the signal line 130. Also, the electrode line 170 surrounds an upper surface 164a of the auxiliary passivation layer 164 overlapped with the signal line 130.

In the display panel according to this another modified embodiment, since the contact area of the connection electrode 180 with the signal line 130 and the electrode line 170 is more increased than that of the display panel according to the third embodiment illustrated in FIG. 10, the resistance of the signal line 130 may further be reduced.

Referring to FIG. 14, an end of the signal line 130 according to still another modified embodiment has a plurality of first protruded patterns 137, and an end of the electrode line 170 has a plurality of third protruded patterns 177.

Each of the plurality of third protruded patterns 177 is protruded toward the end 111 of the lower substrate 110. An outer side 177a of each of the plurality of third protruded patterns 177 is arranged on the substantially same line as the side 110a of the lower substrate 110. Each of the plurality of third protruded patterns 177 is spaced apart from another third protruded pattern at a certain interval. Each of the plurality of third protruded patterns 177 is overlapped with each of the plurality of first protruded patterns 137.

The side electrode pattern 183 is connected with an outer side 137a of each of the plurality of first protruded patterns 137 exposed to the side 110a of the lower substrate 110. Also, the side electrode pattern 183 is connected with the outer side 177a of each of the plurality of third protruded patterns 177 exposed to the side 110a of the lower substrate 110.

The insertion electrode pattern 185 is connected with both sides 137c of each of the plurality of first protruded patterns 137. Also, the insertion electrode pattern 185 is connected with both sides 177c and an upper surface 177b of each of the plurality of third protruded patterns 177.

In the display panel according to this still another modified embodiment, since the contact area of the connection electrode 180 with the signal line 130 and the electrode line 170 is more increased than that of the display panel according to the third embodiment illustrated in FIG. 10, the resistance of the signal line 130 may further be reduced, and thus, a line image defect generated when driving the display panel may be reduced or avoided.

Figure 15:
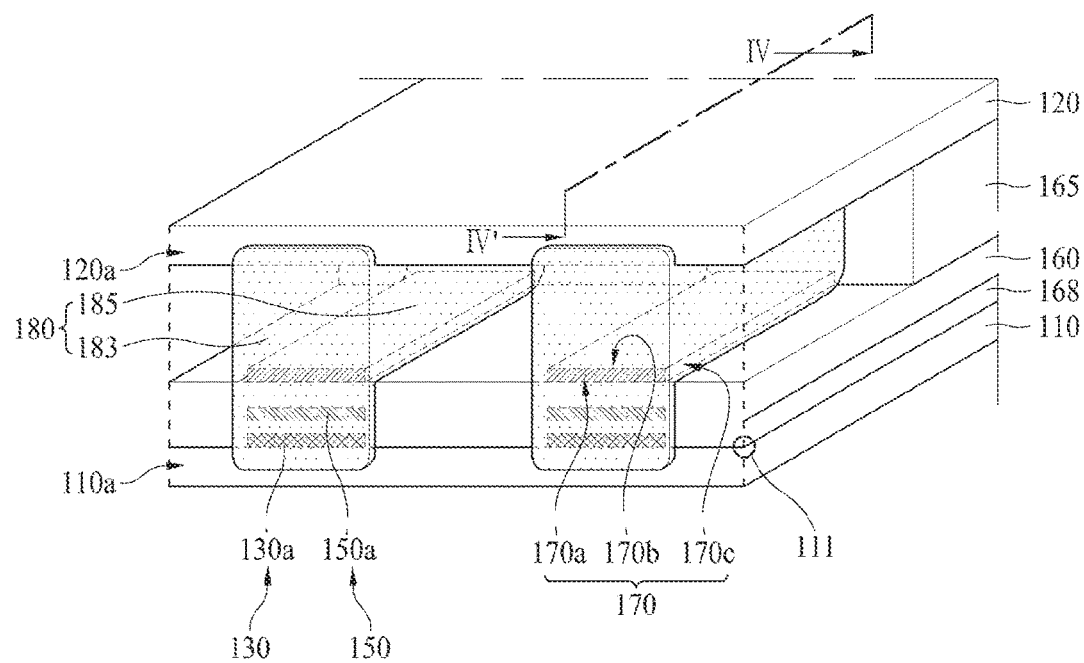
FIG. 15 is a brief view illustrating a display panel according to the fourth embodiment of the present invention.
Figure 16:
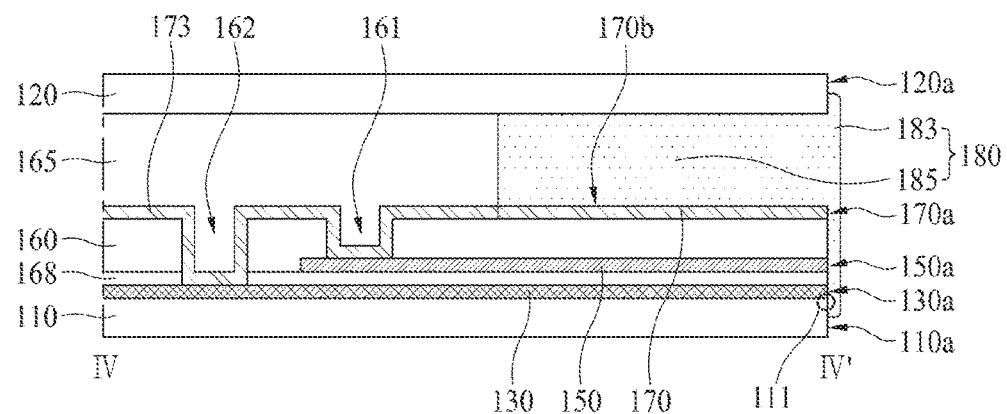
FIG. 16 is a brief cross-sectional view taken along line IV-IV' shown in FIG. 15.

FIG. 15 is a brief view illustrating a display panel according to the fourth embodiment of the present invention, and FIG. 16 is a brief cross-sectional view taken along line IV-IV' shown in FIG. 15. In this embodiment, the display panel according to the second embodiment of the present invention additionally includes an electrode line 170. Therefore, in the following description, the additional electrode line 170 and its related elements will be described in detail, and repeated description of the other elements will be omitted.

Referring to FIGS. 15 and 16, the electrode line 170 according to the fourth embodiment is provided on the signal line 130 and the auxiliary signal line 150. The electrode line 170 is connected with the contact electrode 173. This electrode line 170 is extended from the contact electrode 173 to the end 111 of the lower substrate 110. A passivation layer 160 is provided between the electrode line 170 and the auxiliary signal line 150. Since the auxiliary signal line 150 and the signal line 130 are connected with the contact electrode 173, the electrode line 170 is electrically connected with the auxiliary signal line 150 and the signal line 130 through the contact electrode 173.

In this case, the side electrode pattern 183 is connected with the outer side 130a of the signal line 130, the outer side 150a of the auxiliary signal line 150, and the outer side 170a of the electrode line 170. Also, the insertion electrode pattern 185 covers the upper surface 170b of the electrode line 170. In this case, the insertion electrode pattern 185 may be extended from the upper surface 170b of the electrode line 170 to cover both sides 170c.

According to the fourth embodiment of the present invention, since the connection electrode 180 covers the outer side 130a of the signal line 130, the outer side 150a of the auxiliary signal line 150 and the outer side 170a and the upper surface 170b of the electrode line 170, the contact area between the connection electrode 180 and the signal line 130 may be more increased than that of the second embodiment. As a result, the resistance of the signal line 130 may be reduced, and thus, a line image defect generated when driving the display panel may be reduced or avoided.

Figure 17:
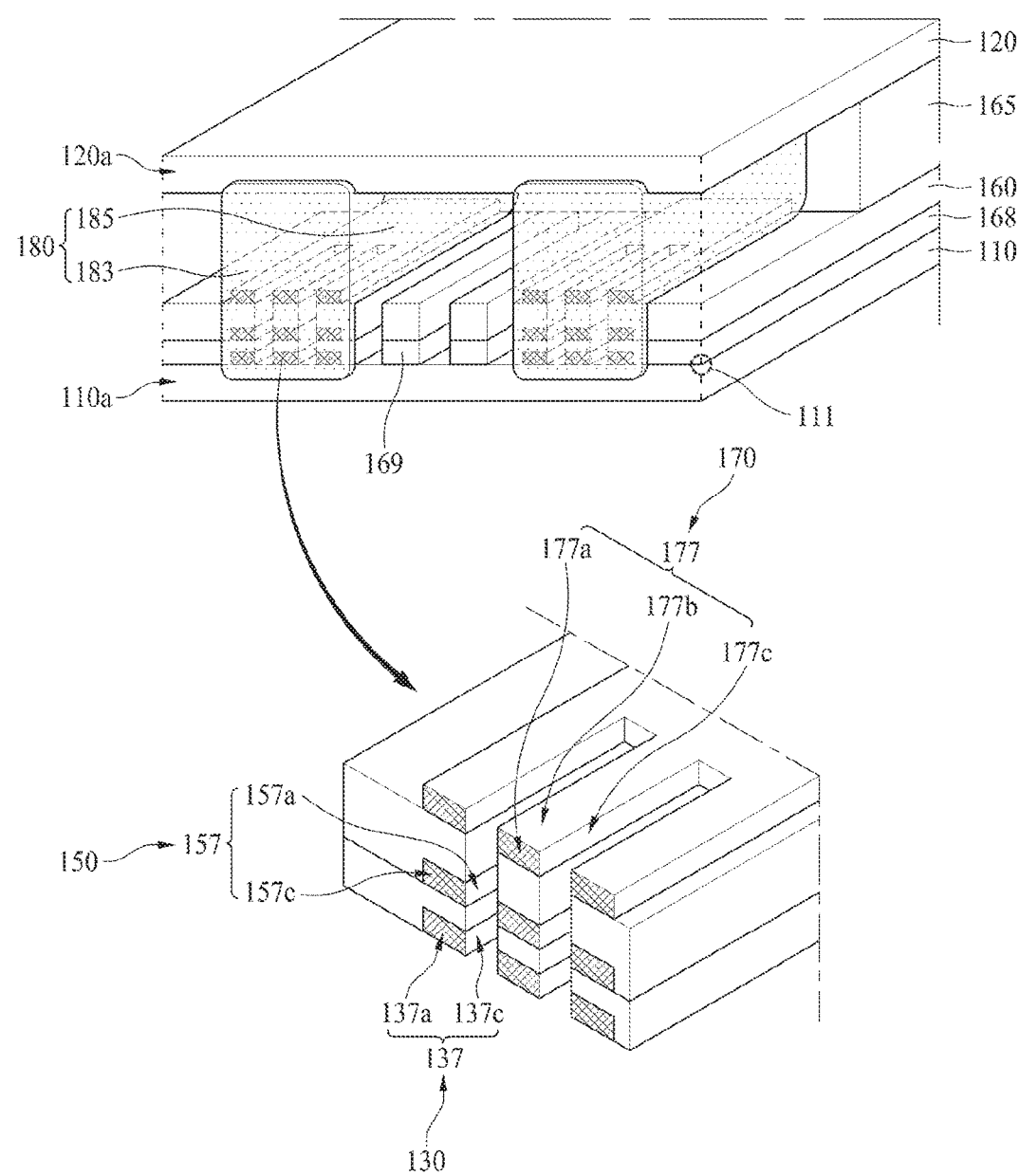
FIG. 17 is a view illustrating a modified embodiment of a display panel according to the fourth embodiment of the present invention.

FIG. 17 is a view illustrating a modified embodiment of a display panel according to the fourth embodiment of the present invention.

Referring to FIG. 17, an end of the signal line 130 according to the modified embodiment of the present invention has a plurality of first protruded patterns 137. An end of the auxiliary signal line 150 has a plurality of second protruded patterns 157. An end of the electrode line 170 has a plurality of third protruded patterns 177. In this case, each of the plurality of first protruded patterns 137 is overlapped with each of the plurality of second protruded patterns 157. Also, each of the plurality of second protruded patterns 157 is overlapped with each of the plurality of third protruded patterns 177.

The side electrode pattern 183 is connected with the outer side 137a of each of the plurality of first protruded patterns 137, the outer side 157a of each of the plurality of second protruded patterns 157 and the outer side 177a of each of the plurality of third protruded patterns 177, which are exposed to the side 110a of the lower substrate 110.

The insertion electrode pattern 185 is connected with both sides 137c of each of the plurality of first protruded patterns 137 and both sides 157c of each of the plurality of second protruded patterns 157. Also, the insertion electrode pattern 185 is connected with both sides 177c and an upper surface 177b of each of the plurality of third protruded patterns 177.

In the display panel according to this modified embodiment, since the contact area of the connection electrode 180 with the signal line 130, the auxiliary signal line 150 and the electrode line 170 is increased, the resistance of the signal line 130 may further be reduced as compared with the display panel according to the fourth embodiment illustrated in FIG. 15. As a result, a line image defect generated when driving the display panel may be reduced or avoided.

Figure 18:
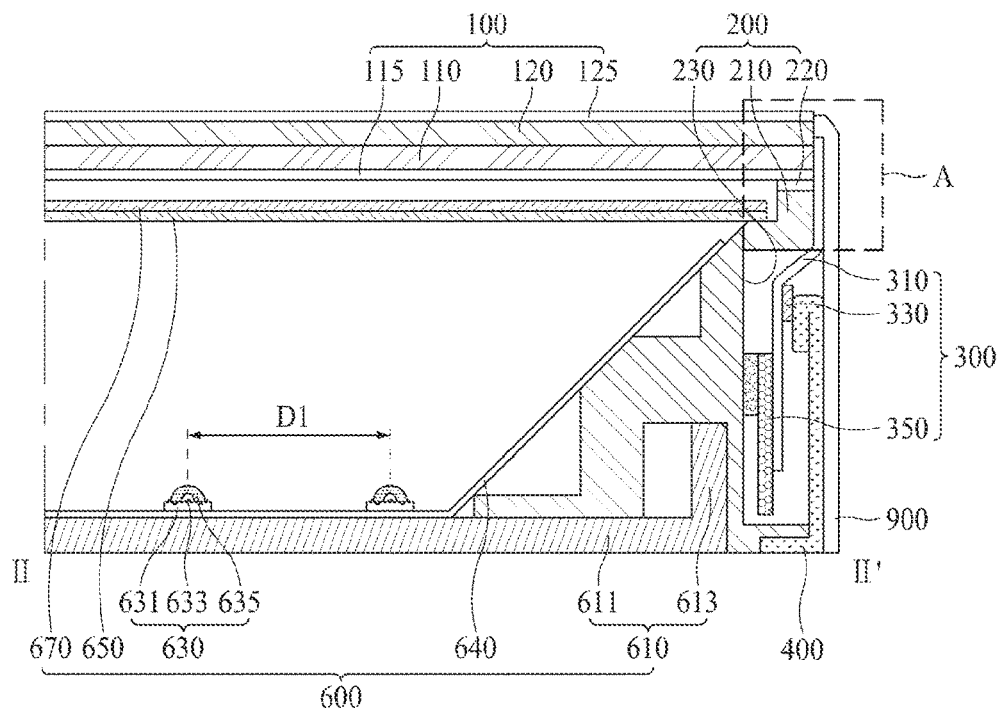
FIG. 18 is a brief view illustrating a display device according to one embodiment of the present invention.
Figure 19:
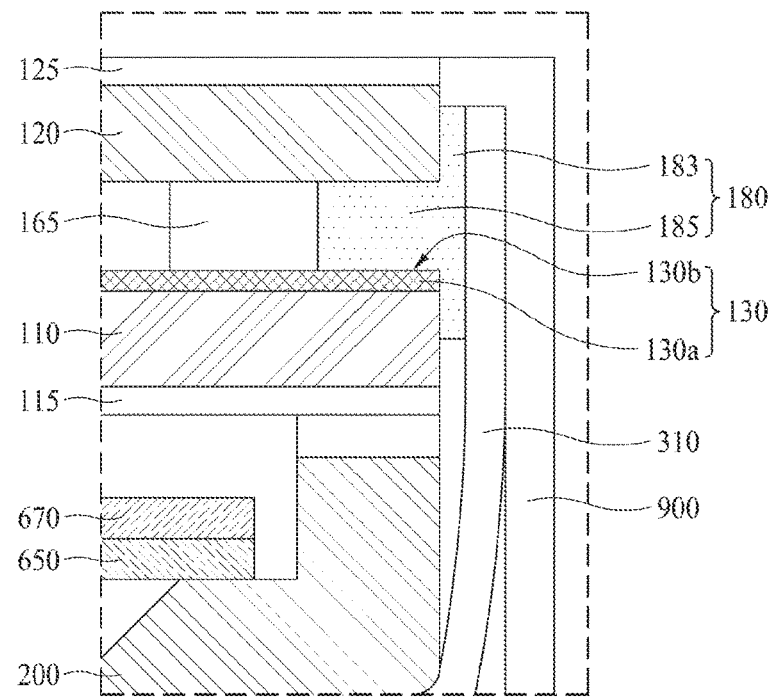
FIG. 19 is an enlarged view illustrating a portion A shown in FIG. 18.

FIG. 18 is a brief view illustrating a display device according to one embodiment of the present invention, and FIG. 19 is an enlarged view illustrating a portion A shown in FIG. 18 and relates to a display device that includes a display panel according to the first embodiment of the present invention illustrated in FIG. 2. Therefore, the same reference numbers will be used throughout the drawings to refer to the same or like parts, and repeated description in a material and structure of each element will be omitted.

The display device according to one embodiment of the present invention includes a display panel 100, a panel support frame 200, a driving circuit 300, a cover shield 400, a side cover film 900, and a backlight unit 600.

The display panel 100 displays a predetermined image by controlling transmittance of incident light from a plurality of light sources. To this end, the display panel 100 includes a lower substrate 110, an upper substrate 120, a lower polarizing film 115, an upper polarizing film 125, and a connection electrode 180.

The lower substrate 110 includes a signal line 130. The signal line 130 is connected with the driving circuit 300 through the connection electrode 180.

The upper substrate 120 is bonded to the lower substrate 110 by a sealing member 165. In this case, the sealing member 165 is provided to be spaced apart from the end 111 of the lower substrate 110. Elements of the upper substrate 120 and the lower substrate 110 have been described with reference to the aforementioned various embodiments.

The lower polarizing film 115 is attached to a lower surface of the lower substrate 110 and polarizes the light entering the lower substrate 110. At this time, the lower polarizing film 115 may be attached to an entire lower surface of the lower substrate 110 or may be attached to another portion except the lower edge portion of the lower substrate 110.

The upper polarizing film 125 is attached to a front surface of the upper substrate 120 and polarizes the light emitted to the outside after transmitting the upper substrate 120.

The lower polarizing film 115 and the upper polarizing film 125 have their respective polarizing functions different from each other through elongation processes in opposite directions, and have contractile forces opposite to each other based on the elongation directions. As the lower polarizing film 115 and the upper polarizing film 125 are respectively attached to the lower substrate 110 and the upper substrate 120, contractile forces of the lower polarizing film 115 and the upper polarizing film 125 are mutually counterbalanced, whereby the display panel 100 forms a plane state substantially without being bent upwardly or downwardly.

The connection electrode 180 is provided at one side of the lower substrate 110 and the upper substrate 120, which are bonded to each other, and is connected with the signal line 130. In this case, the connection electrode 180 may electrically be connected with the signal line 130. The connection electrode 180 is connected with the outer side 130a of the signal line 130 exposed to the side 110a of the lower substrate 110. The connection electrode 180 is connected with the outer side 130a of the signal line 130 and inserted between the upper substrate 120 and the lower substrate 110. The connection electrode 180 electrically connects the signal line 130 with the driving circuit 300.

According to one embodiment of the present invention, the connection electrode 180 connected with the signal line 130 is provided at one side of the lower substrate 110 and the upper substrate 120, and the driving circuit 300 is attached to the connection electrode 180. As a result, the lower substrate 110 and the upper substrate 120 may be provided to have the same size. For example, the lower substrate 110 and the upper substrate 120 may be arranged congruently. As a result, a size of a bezel area of the display device may be reduced.

Also, since the connection electrode 180 is connected with the outer side 130a, the upper surface 130b and both sides 130c of the signal line 130, the contact area between the signal line 130 and the connection electrode 180 may be more increased than that of the related art in which the connection electrode 180 is connected with the outer side 130a of the signal line 130. As a result, the resistance of the signal line 130 may be reduced, and thus, a line image defect generated when driving the display panel may be reduced or avoided.

The panel support frame 200 supports a rear edge portion of the display panel 100, and receives the driving circuit 300 therein. The panel support frame 200 includes a sidewall portion 210 and a receiving portion 230.

The sidewall portion 210 supports the rear edge portion of the display panel 100 and an upper portion of the driving circuit 300. In this case, a panel coupling member 220 may be provided between the sidewall portion 210 and the display panel 100. The display panel 100 may stably be fixed onto the sidewall portion 210 by the panel coupling member 220. The panel coupling member 220 may be an optical hardening adhesive, a thermal hardening adhesive, a double-sided tape, a double-sided adhesive pad, or the like.

The receiving portion 230 is provided at an outer side of the sidewall portion 210. The receiving portion 230 receives a lower portion of the driving circuit 300. To this end, the receiving portion 230 is concavely provided at an outer side of the panel support frame 200.

The driving circuit 300 is arranged at one side of the display panel 100, and is connected with the signal line 130 through the connection electrode 180. The upper portion of the driving circuit 300 is supported in the sidewall portion 210 and electrically connected with the signal line 130. Also, the lower portion of the driving circuit 300 is received in the receiving portion 230.

The driving circuit 300 includes a flexible circuit film 310, a driving integrated circuit 330, and a printed circuit board 350.

The flexible circuit film 310 is connected with the signal line 130 by being attached to the connection electrode 180 provided at one side of the display panel 100. That is, the flexible circuit film 310 is attached to the side of the lower substrate 110 and the upper substrate 120 in accordance with a side bonding manner. An upper portion of the flexible circuit film 310 is supported in the outer side of the sidewall portion 210 of the panel support frame 200, and its lower portion is bent from its upper portion and received in the receiving portion 230.

The driving integrated circuit 330 is packaged in the flexible circuit film 310. The driving integrated circuit 330 may be packaged in, but not limited to, a chip on film (COF).

The printed circuit board 350 is received in the receiving portion 230 and attached to the lower surface of the flexible circuit film 310. The printed circuit board 350 is connected with the flexible circuit film 310, and applies various signals for driving of the display panel 100 to the flexible circuit film 310.

The cover shield 400 is provided at one side of the panel support frame 200. A lower portion of the cover shield 400 is secured with the panel support frame 200. The cover shield 400 covers the driving circuit 300 received in the receiving portion 230.

The side cover film 900 is arranged at one side of the panel support frame 200. The side cover film 900 covers the driving circuit 300 and the cover shield 400. The side cover film 900 serves to reduce or prevent an external light from entering the display device and at the same time, serves to reduce or prevent a light leakage from being generated at a joint portion of the display device. Since the side cover film 900 surrounds the side of the display module, esthetic appearance of the display device may be improved.

The backlight unit 600 includes a rear cover 610, a plurality of light source modules 630, a reflective sheet 640, a diffusion sheet 650, and an optical sheet portion 670.

The rear cover 610 is arranged below the display panel 100 and coupled to the panel support frame 200. The rear cover 610 according to one embodiment is formed to include a receiving space formed concavely to have a certain height, and receives the plurality of light source modules 630 therein. For example, the rear cover 610 may include a bottom support 611 and a cover sidewall 613.

The bottom support 611 is formed to face the other portion except the edge portion of the display panel 100, and supports the plurality of light source modules 630.

The cover sidewall 613 is bent at a certain height from each side of the bottom support 611 to surround an upper portion of the bottom support 611 and forms a receiving space on the bottom support 611. In this case, the cover sidewall 613 may be formed to be inclined at a certain angle from each side of the bottom support 611. The cover sidewall 613 is secured to the lower surface of the panel support frame 200.

As a result, the bottom support 611 of the rear cover 610 and an inner inclined surface of the panel support frame 200 are arranged to be adjacent to each other.

The plurality of light source modules 630 are arranged at the bottom support 611 of the rear cover 610 to have a certain interval D1 and irradiates light to the diffusion sheet 650. The plurality of light source modules 630 according to one embodiment include a light source printed circuit board 631, a point light source package 633, and a light diffusion lens 635.

The light source printed circuit board 631 is arranged at the bottom support 611 of the rear cover 610 to have a certain interval. A backlight driving signal line and a connector are packaged in the light source printed circuit board 631, and the light source printed circuit board 631 is connected to an external backlight driving circuit through the connector.

The point light source package 633 is packaged on the light source printed circuit board 631 at a certain interval and electrically connected with the backlight driving signal line, whereby the point light source package 633 emits light through a backlight driving signal supplied from the backlight driving signal line. The point light source package 633 may include a light emitting diode driving chip.

The light diffusion lens 635 is packaged on the light source printed circuit board 631 to cover the point light source package 633. The light diffusion lens 635 disperses center luminance of the light source modules 630 by diffusing the light emitted from the point light source package 633 to reduce or prevent a hot spot from occurring and increase an emission area of light. For example, the light diffusion lens 635 may have, but not limited to, a sectional shape such as a semi-sphere shape and a semi-sphere shape of which center is concave. The light diffusion lens 635 may be formed to have a shape that may diffuse light.

The interval D1 between the plurality of light source modules 630 may be defined as a pitch between centers of the point light source packages 633 which are adjacent to each other. This interval D1 may be set in accordance with an optical gap OG between the upper surface of the light source printed circuit board 631 and the diffusion sheet 650, whereby luminance of the display panel 100 may uniformly be provided to the entire area.

The reflective sheet 640 is attached to the bottom support 611 of the lower cover 610 and the inner inclined surface of the panel support frame 200. The reflective sheet 640 serves to reflect the light emitted from the plurality of light source modules 630, toward the display panel 100.

Although not shown, a plurality of reflective patterns of which sizes and intervals are different from one another may be formed on the reflective sheet 640. The light emitted from the plurality of light source modules 630 travels toward the display panel 100 through the reflective patterns.

The reflective sheet 640 may be made of, but not limited to, a polyester (PET) film, and may be made in a plate shape in which a plurality of reflective patterns are formed. Also, the reflective sheet 640 may be formed of a multi-layered structure in which a film-type reflective sheet 640 is attached onto a plastic plate.

The diffusion sheet 650 is arranged below the display panel 100 to cover the bottom support 611 of the rear cover 610 and diffuses the incident light from the plurality of light source modules 630. This diffusion sheet 650 substitutes for the related art diffusion plate, and is formed at a thickness relatively thinner than the related art diffusion plate to include at least one of a haze, a light diffusion pattern and a light diffusion member.

The optical sheet portion 670 is arranged on the light source modules 630 and irradiates the incident light from the light source modules 630 to the display panel 100 by improving luminance property of the light.

The optical sheet portion 670 may include, but not limited to, a lower diffusion sheet, a prism sheet, and an upper diffusion sheet. The optical sheet portion 670 may be comprised of a combination of two or more selected from a diffusion sheet, a prism sheet, a dual brightness enhancement film and a lenticular sheet.

The optical sheet portion 670 serves to direct light toward the display panel 100 by condensing and diffusing the light, whereby luminance of the display panel 100 may be increased.

The embodiments of the present invention have been exemplarily described based on a liquid crystal display device, but the present invention is not limited thereto and can be applied to various types of display devices, for example, an organic light emitting display device, as well as a liquid crystal display device.

According to an embodiment of the present invention, since a connection electrode covers an outer side and an upper surface of a signal line, a contact area between the connection electrode and the signal line can be increased as compared with the related art in which the connection electrode covers only the outer side of the signal line.

As a result, the resistance of the signal line may be reduced, and thus, a line image defect generated when driving the display panel may be reduced or prevented. Also, reliability of the display panel may be improved.

According to an aspect of the present disclosure, a display panel may comprise: a lower substrate having a signal line; an upper substrate bonded to the lower substrate by a sealing member; and a connection electrode connected to an outer side of the signal line exposed to a side of the lower substrate, wherein the connection electrode is connected with the outer side of the signal line and inserted between the upper substrate and the lower substrate.

The connection electrode may include: a side electrode pattern connected to the outer side of the signal line, covering a side of at least one of the lower substrate and the upper substrate; and an insertion electrode pattern inserted between the upper substrate and the lower substrate.

The insertion electrode pattern may be connected with an upper surface of the signal line between the upper substrate and the lower substrate.

An end of the signal line may be comprised of a plurality of protruded patterns, the side electrode pattern may be connected to an outer side of each of the plurality of protruded patterns exposed to the side of the lower substrate, and the insertion electrode pattern may be connected to both sides and an upper surface of each of the plurality of protruded patterns.

The display panel may further comprise: an auxiliary signal line provided on the signal line; and a contact electrode overlapped with the sealing member, connecting the signal line with the auxiliary signal line, wherein the side electrode pattern is connected to an outer side of each of the auxiliary signal line and the signal line, which are exposed to the side of the lower substrate, and the insertion electrode pattern is connected to an upper surface of the auxiliary signal line.

The end of the signal line may have a plurality of first protruded patterns, an end of the auxiliary signal line may have a plurality of second protruded patterns respectively overlapped with the plurality of first protruded patterns, the side electrode pattern may be connected to an outer side of each of the plurality of first and second protruded patterns, and the insertion electrode pattern may be connected both sides of each of the plurality of first protruded patterns and connected to both sides and an upper surface of each of the plurality of second protruded patterns.

The display panel may further comprise: an electrode line provided on the signal line; and an auxiliary contact electrode connecting the signal line with the electrode line at an area overlapped with the sealing member, wherein the side electrode pattern is connected to an outer side of each of the signal line and the electrode line, which are exposed to the side of the lower substrate, and the insertion electrode pattern is connected to an upper surface of the electrode line.

The end of the signal line may have a plurality of first protruded patterns, an end of the electrode line may have a plurality of third protruded patterns respectively overlapped with the plurality of first protruded patterns, the side electrode pattern may be connected to an outer side of each of the plurality of first and third protruded patterns, and the insertion electrode pattern may be connected to both sides of each of the plurality of first protruded patterns and connected to both sides and an upper surface of each of the plurality of third protruded patterns.

The display panel may further comprise a passivation layer provided between the signal line and the electrode line, having at least one slit partially exposing the upper surface of the signal line, wherein the electrode line is connected with a part of the upper surface through the slit and surrounds a side of the slit and an upper surface of the passivation layer overlapped with the signal line.

The display panel may further comprise: an auxiliary signal line provided on the signal line; an electrode line provided on the auxiliary signal line; and a contact electrode connecting the signal line, the auxiliary signal line and the electrode line with one another, wherein the side electrode pattern is connected to an outer side of each of the auxiliary signal line, the electrode line and the signal line, which are exposed to the side of the lower substrate, and the insertion electrode pattern is connected to the upper surface of the electrode line.

The end of the signal line may have a plurality of first protruded patterns, an end of the auxiliary signal line may have a plurality of second protruded patterns respectively overlapped with the plurality of first protruded patterns, an end of the electrode line may have a plurality of third protruded patterns respectively overlapped with the plurality of second protruded patterns, the side electrode pattern may be connected to an outer side of each of the plurality of first to third protruded patterns, and the insertion electrode pattern may be connected both sides of each of the plurality of first and second protruded patterns and connected to both sides and an upper surface of each of the plurality of third protruded patterns.

The sealing member may be spaced apart from the end of the lower substrate to insert the connection electrode between the upper substrate and the lower substrate.

The display panel may further comprise at least one barrier pattern provided in parallel with at least one of both sides of the signal line.

According to another aspect of the present disclosure, a display device may comprise: the display panel; a driving circuit provided at one side of the display panel; and a backlight unit arranged below the display panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display panel, comprising:
a first substrate comprising a signal line that extends to an end of the first substrate;
a second substrate facing the first substrate; and
a connection electrode inserted between the first substrate and the second substrate and electrically connected to the signal line,
wherein the connection electrode is connected to an outer side of the signal line that substantially corresponds to the end of the first substrate,
wherein the connection electrode further comprises an insertion electrode pattern inserted between the first substrate and the second substrate, and a side electrode pattern covering an outer side of the first substrate and an outer side of the second substrate,
wherein the insertion electrode pattern covers at least one lateral side of the signal line, and covers opposite lateral sides of the signal line.

2. The display panel of claim 1, wherein the connection electrode at least partially covers a surface of the signal line facing the second substrate.

3. The display panel of claim 1, wherein an end of the signal line substantially corresponding to the end of the first substrate comprises a plurality of protruded patterns that protrude towards the end of the first substrate,
wherein the connection electrode is inserted between at least one pair of protruded patterns which are adjacent to each other,
wherein an outer side of each of the plurality of protruded patterns is arranged on the same line as that of the outer side of the first substrate,
wherein the connection electrode is inserted between each pair of protruded patterns which are adjacent to each other.

4. The display panel of claim 3, wherein the connection electrode covers an outer side, a surface facing the second substrate, and opposite lateral sides of each of the plurality of protruded patterns.

5. A display panel, comprising:
a first substrate comprising a signal line that extends to an end of the first substrate;
a second substrate facing the first substrate;
a connection electrode inserted between the first substrate and the second substrate and electrically connected to the signal line;
an auxiliary signal line disposed on the signal line with an insulating layer provided between the signal line and the auxiliary signal line, the auxiliary signal line extending to the end of the first substrate; and
a contact electrode provided on the signal line and the auxiliary signal line and electrically connecting the signal line with the auxiliary signal line,
wherein the connection electrode is provided between the auxiliary signal line and the second substrate,
wherein the connection electrode is electrically connected to the auxiliary signal line,
wherein the connection electrode is connected to an outer side of the auxiliary signal line that substantially corresponds to the end of the first substrate, and
wherein the connection electrode at least partially covers a surface of the auxiliary signal line facing the second substrate.

6. The display panel of claim 5, wherein the connection electrode comprises:
a side electrode pattern connected to the outer side of the signal line and the outer side of the auxiliary signal line and at least partially covering an outer side of the first substrate or an outer side of the second substrate; and
an insertion electrode pattern inserted between the first substrate and the second substrate and at least partially covering the surface of the auxiliary signal line facing the second substrate.

7. The display panel of claim 6, wherein:
an end of the signal line substantially corresponding to the end of the first substrate comprises a plurality of first protruded patterns that protrude towards the end of the first substrate; and
an end of the auxiliary signal line substantially corresponding to the end of the first substrate comprises a plurality of second protruded patterns that protrude towards the end of the first substrate;
wherein the connection electrode is inserted between at least one pair of first protruded patterns which are adjacent to each other,
wherein the connection electrode is inserted between at least one pair of second protruded patterns which are adjacent to each other,
wherein an outer side of each of the plurality of first protruded patterns is arranged on the same line as that of the outer side of the first substrate, and
wherein an outer side of each of the plurality of second protruded patterns is arranged on the same line as that of the outer side of the first substrate.

8. The display panel of claim 7, wherein the side electrode pattern is connected with an outer side of each of the plurality of first protruded patterns and an outer side of each of the plurality of second protruded pattern, which are exposed to the outer side of the first substrate, and wherein the insertion electrode pattern is connected with opposite lateral sides of each of the plurality of first protruded patterns, with opposite lateral sides of each of the plurality of second protruded patterns, and with a surface of each of the plurality of second protruded patterns facing the second substrate.

9. A display panel, comprising:
a first substrate comprising a signal line that extends to an end of the first substrate;
a second substrate bonded to the first substrate by a sealing member;
a connection electrode inserted between the first substrate and the second substrate and electrically connected to the signal line; and
an electrode line disposed on the signal line that extends to the end of the first substrate, and a passivation layer provided between the signal line and the electrode line;
wherein the connection electrode is electrically connected to the electrode line,
wherein the connection electrode is connected to an outer side of the electrode line that substantially corresponds to the end of the first substrate, and at least partially covers a surface of the electrode line facing the second substrate, and
wherein the electrode line is in physical contact with the signal line through at least one opening provided in the passivation layer.

10. The display panel of claim 9, wherein the at least one opening comprises at least one contact hole.

11. The display panel of claim 9, wherein the at least one opening comprises at least one slit arranged in parallel with a long side of the signal line.

12. The display panel of claim 9, wherein the connection electrode comprises:
a side electrode pattern connected to the outer side of the signal line and the outer side of the electrode line and at least partially covering an outer side of the first substrate or an outer side of the second substrate; and
an insertion electrode pattern inserted between the first substrate and the second substrate and at least partially covering the surface of the electrode line facing the second substrate.

13. The display panel of claim 12, wherein:
an end of the signal line substantially corresponding to the end of the first substrate comprises a plurality of first protruded patterns that protrude towards the end of the first substrate; and
an end of the electrode line substantially corresponding to the end of the first substrate comprises a plurality of third protruded patterns that protrude towards the end of the first substrate;
wherein the connection electrode is inserted between at least one pair of first protruded patterns which are adjacent to each other,
wherein the connection electrode is inserted between at least one pair of third protruded patterns which are adjacent to each other,
wherein an outer side of each of the plurality of first protruded patterns is arranged on the same line as that of the outer side of the first substrate, and
wherein an outer side of each of the plurality of third protruded patterns is arranged on the same line as that of the outer side of the first substrate.

14. The display panel of claim 13, wherein the side electrode pattern is connected with an outer side of each of the plurality of first protruded patterns and an outer side of each of the plurality of third protruded patterns, which are exposed to the outer side of the first substrate, and
wherein the insertion electrode pattern is connected with opposite lateral sides of each of the plurality of first protruded patterns, with opposite lateral sides of each of the plurality of third protruded patterns, and with a surface of each of the plurality of third protruded patterns facing the second substrate.

15. The display panel of claim 9, wherein the first substrate further comprises:
an auxiliary signal line disposed between the signal line and the electrode line with the passivation layer arranged between the auxiliary signal line and the electrode line and an insulating layer arranged between the signal line and the auxiliary signal line,
wherein the connection electrode covers an outer side of the auxiliary signal line that substantially corresponds to the end of the first substrate, and
wherein the electrode line is in physical contact with the auxiliary signal line through at least one opening, a contact hole, provided in the passivation layer.

16. The display panel of claim 15, wherein:
an end of the signal line substantially corresponding to the end of the first substrate comprises a plurality of first protruded patterns that protrude towards the end of the first substrate;
an end of the auxiliary signal line substantially corresponding to the end of the first substrate comprises a plurality of second protruded patterns that protrude towards the end of the first substrate; and
an end of the electrode line substantially corresponding to the end of the first substrate comprises a plurality of third protruded patterns that protrude towards the end of the first substrate;
wherein the connection electrode is inserted between at least one pair of first protruded patterns which are adjacent to each other,
wherein the connection electrode is inserted between at least one pair of second protruded patterns which are adjacent to each other,
wherein the connection electrode is inserted between at least one pair of third protruded patterns which are adjacent to each other,
wherein an outer side of each of the plurality of first protruded patterns is arranged on the same line as that of the outer side of the first substrate,
wherein an outer side of each of the plurality of second protruded patterns is arranged on the same line as that of the outer side of the first substrate, and
wherein an outer side of each of the plurality of third protruded patterns is arranged on the same line as that of the outer side of the first substrate.

17. The display panel of claim 16, wherein the connection electrode comprises:
a side electrode pattern connected to the outer side of the signal line, the outer side of the auxiliary signal line and the outer side of the electrode line and at least partially covering an outer side of the first substrate or an outer side of the second substrate; and
an insertion electrode pattern inserted between the first substrate and the second substrate and at least partially covering the surface of the electrode line facing the second substrate;
wherein the side electrode pattern is connected with an outer side of each of the plurality of first protruded patterns, an outer side of each of the plurality of second protruded patterns and an outer side of each of the plurality of third protruded patterns, which are exposed to the outer side of the first substrate, and wherein the insertion electrode pattern is connected with opposite lateral sides of each of the plurality of first protruded patterns, with opposite lateral sides of each of the plurality of second protruded patterns, with opposite lateral sides of each of the plurality of third protruded patterns, and with a surface of each of the plurality of third protruded patterns facing the second substrate.

18. The display panel of claim 1, further comprising at least one barrier pattern arranged next to the signal line and configured to prevent an electrical short between the signal line and an additional signal line of the first substrate, wherein the at least one barrier pattern is arranged in parallel with at least one lateral side of the signal line.

19. A display device, comprising:

a display panel according to claim 1; and a driving circuit connected to the signal line of the display panel through the connection electrode of the display panel.

* * * * *